United States Patent [19]

Glassett

[11] Patent Number: 4,716,420
[45] Date of Patent: Dec. 29, 1987

[54] PEN TURRET ROTATION FOR PLOTTERS
[75] Inventor: Kevin L. Glassett, San Diego, Calif.
[73] Assignee: Hewlett-Packard Company, Palo Alto, Calif.
[21] Appl. No.: 923,353
[22] Filed: Oct. 27, 1986
[51] Int. Cl.[4] .......................... G01D 9/30; G01D 9/00; F16H 21/44; F16H 1/16
[52] U.S. Cl. .................................. 346/139 R; 346/49; 74/110; 74/425
[58] Field of Search ................ 346/49, 139 R; 74/110, 74/325, 342, 425

[56] References Cited
U.S. PATENT DOCUMENTS
4,488,159 12/1984 Fujiwara et al. ................ 346/139 R
4,504,838 3/1985 Tamai et al. ................ 346/139 R X Primary Examiner—E. A. Goldberg
Assistant Examiner—Patrick W. Foster
Attorney, Agent, or Firm—William J. Bethurum

[57] ABSTRACT

In a plotter (10) having a plurality of pens (14) stored in a rotatable turret (16) for selective use in a plotting operation, the turret may be rotated by the drive motor (32) used to move the paper (12) bidirectionally, thereby eliminating the cost and weight associated with a pen turret drive motor. The rotation of the turret is mechanically coupled to a grit wheel shaft (34), which is used to move the paper and which is driven by the paper drive motor. The turret is positioned on a spindle (86) provided with slots (88) associated with the location of the pens. The bottom of the spindle is provided with a worm gear (110), which is continuously engaged by a worm (94) mounted on one end of a worm shaft (96). The grit wheel shaft is also provided with a gear (104) which is selectively engageable by a sliding gear (102) mounted on the other end of the worm shaft. A lever engager (98) is actuated by a foot (106) on the bottom of the carriage assembly (56) which supports a pen during the plotting operation. Upon actuation by the foot, the lever engager causes the sliding gear to engage the grit wheel shaft gear, thereby coupling rotation of the grit wheel shaft to the spindle. A spring (112) on the worm shaft returns the sliding gear to its disengaged position. The lever engager includes a walking stop (100) to engage the preselected slot in the spindle to provide appropriate orientation of the turret for removal or replacement of a pen therein.

7 Claims, 7 Drawing Figures

_4,716,420_

PEN TURRET ROTATION FOR PLOTTERS

TECHNICAL FIELD

The present application relates to plotters using a plurality of pens stored in a rotatable turret, and, more particularly, to improving the operation of the plotter with respect to the rotation of the turret.

BACKGROUND ART

With the advent of low-cost microprocessors, pen plotters with high speed and resolution have become increasingly sophisticated. Such pen plotters, which are usually driven by command from an external computer, include a means for supporting paper or other medium, a mechanism for moving the paper back and forth during plotting, a carriage which supports a pen during the plotting operation, a mechanism for moving the carriage normal to the movement of the paper during plotting, a pen turret for storing a plurality of pens for use in plotting, and a mechanism for rotating the turret.

The use of a pen turret permits utilization of a plurality of pens, such as different colors, different pen tip widths, and the like to provide a variety of pen plots. Conventionally, the pen turret is rotated by a separate motor, mechanically coupled to the turret. The microprocessor permits the operator to select the sequence of pens to be used in the plot and then drives the pen turret motor at the appropriate time to rotate the turret when a particular pen is to be selected therefrom.

In one variety of plotter, the turret motor is coupled to the pen turret by geneva motion. However, while this system is reliable and accurate, it does require a separate motor to drive the pen turret.

In another variety of plotter, the pen turret has a ring gear turned by a very accurate stepper motor, with light sources and detectors to sense the pen positions. However, this system not only requires a separate motor to drive the pen turret, but it also is very expensive and is more complex than the geneva motion.

Such plotters work fine, but attempts continue to find ways to improve performance, cut cost, reduce weight and the like.

DISCLOSURE OF INVENTION

In accordance with the invention, a pen plotter is provided. The pen plotter is capable of making plots requiring the use of several different pens maintained in a rotatable turret. The pen plotter employs mechanical coupling of the means used to move the paper to also provide rotation of the turret. The carriage assembly is used to activate the mechanical coupling.

Use of the paper moving motor to also rotate the turret eliminates the need for a costly motor or solenoid and also reduces weight of the plotter. Use of the linking mechanism of the invention enables very accurate positioning of the turret because of an accurate encoder on the paper axis motor.

BEST MODES FOR CARRYING OUT THE INVENTION

Figure 1:
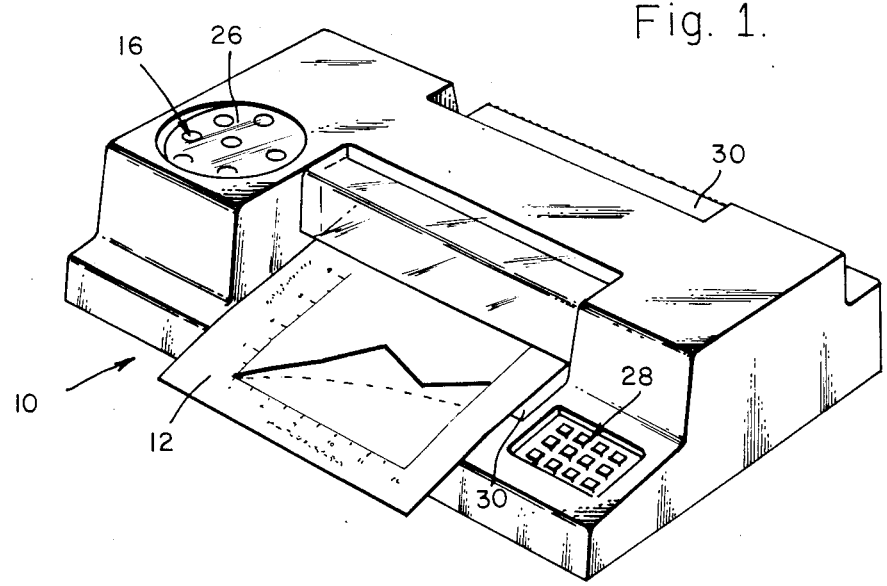
FIG. 1 is a perspective view of a pen plotter having a rotatable turret.

Referring now to the drawings wherein like numerals of reference designate like elements throughout, a plotter is generally shown at 10. The plotter 10 is suitable for preparing plots, such as X-Y graphs, bar charts, pie charts, and the like on a medium 12 such as paper. The plotter 10 is not described in great detail herein, except in those areas relevant to the invention, since the plotter itself is well-known.

Figure 7:
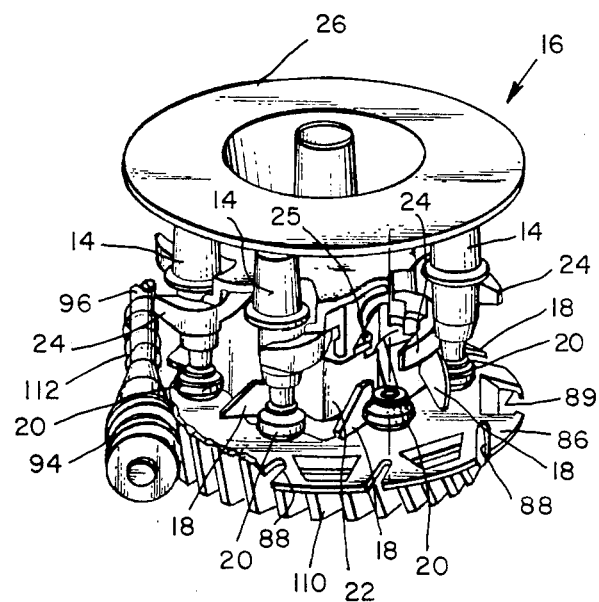
FIG. 7 is a perspective view, partly in cross-section, of the turret and spindle, showing engagement of a worm gear on the spindle by a worm drive.

The plotter 10 is of the type employing a plurality of pens 14. Such pens are held in a pen turret 16, in releasable fashion. The pen turret 16 is depicted in greater detail in FIG. 7.

The turret 16, as is conventional, comprises a plurality of cappers 18 and pen boots 20 downwardly movably secured in a turret hub 22 by a turret spring (not shown). The pen boots 20 prevent drying of the tips of the pens 14 during storage on the turret 16, and are downwardly movable able by the cappers 18 to permit the pen to be removed from the turret, as described more fully below.

A plurality of pawls 24 are retractably secured to the turret 16 and are each opposed by a finger 25, which hold the pens 14 in position. A cover plate 26 is attached to the top of the turret 16. The cover plate 26 is labeled with the position of each pen 14. In a common embodiment, eight pen positions are provided.

Rotation of the pen turret 16 permits one of the plurality of pens 14 to be selected, whether by color, pen tip width, ink composition, or other property. A control panel 28 on the plotter 10 permits input of instructions to a microprocessor (not shown) for selection of pens, etc.

In operation, a button on the control panel 28 is pressed by the operator to select a new pen 14. Pressing the button causes the microprocessor to rotate the turret to the desired position. Alternately, the computer controlling the plotter may be programmed to select the desired pen by sending a command to the microprocessor, which then causes the turret to rotate to the appropriate position.

The medium 12 (paper is assumed herein, but other media, such as mylar, may also be employed) is largely supported on a horizontal, flat platform 30, which extends from the front to the rear of the printer 10. The paper 12 is moved bidirectionally and intermittently along the X-axis (the axis running from the front to the rear of the plotter 10).

Figure 3:
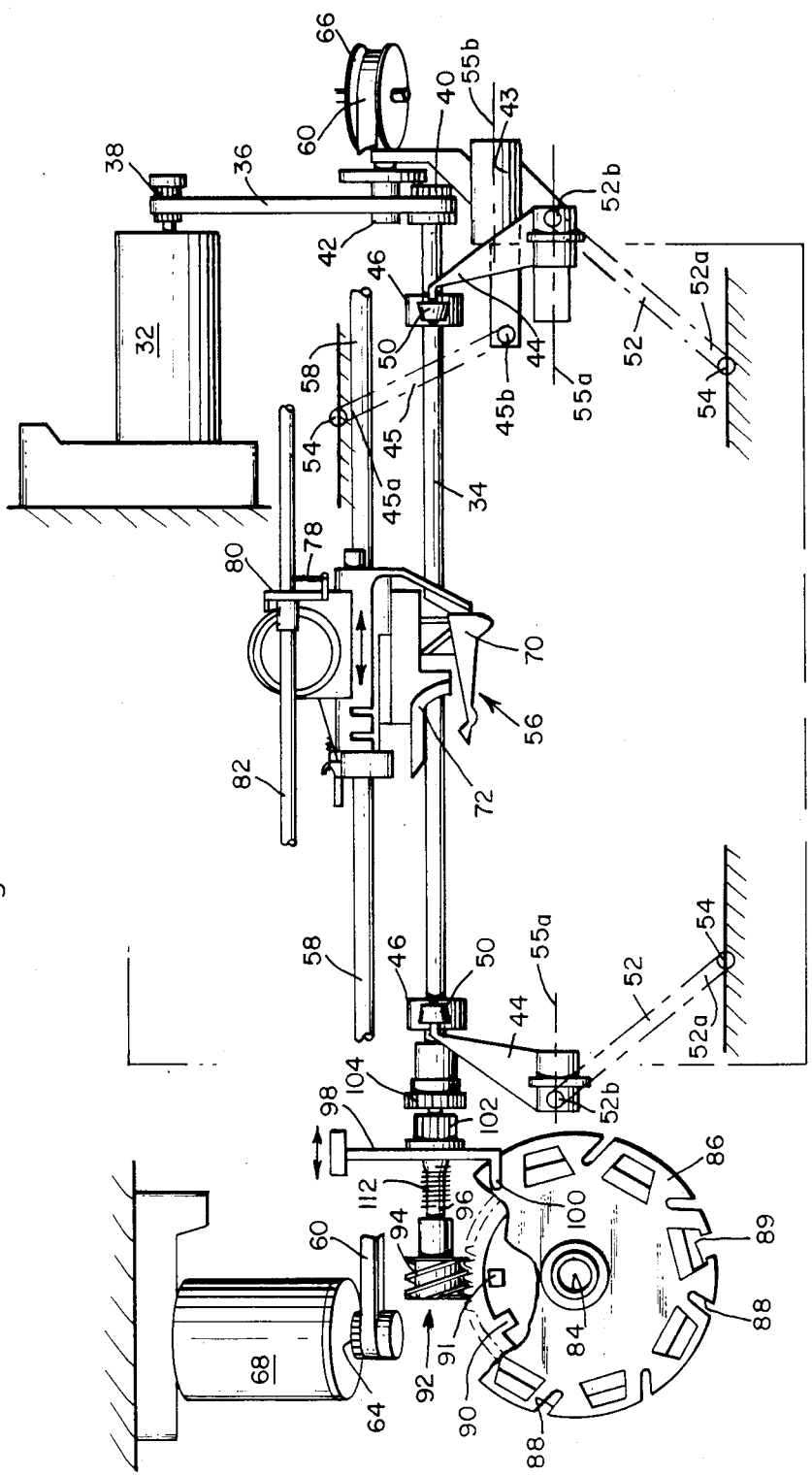
FIG. 3 is a top plan view, in skeleton, of the essential drive and actuation mechanism coupling the paper axis motor and the turret.
Figure 4:
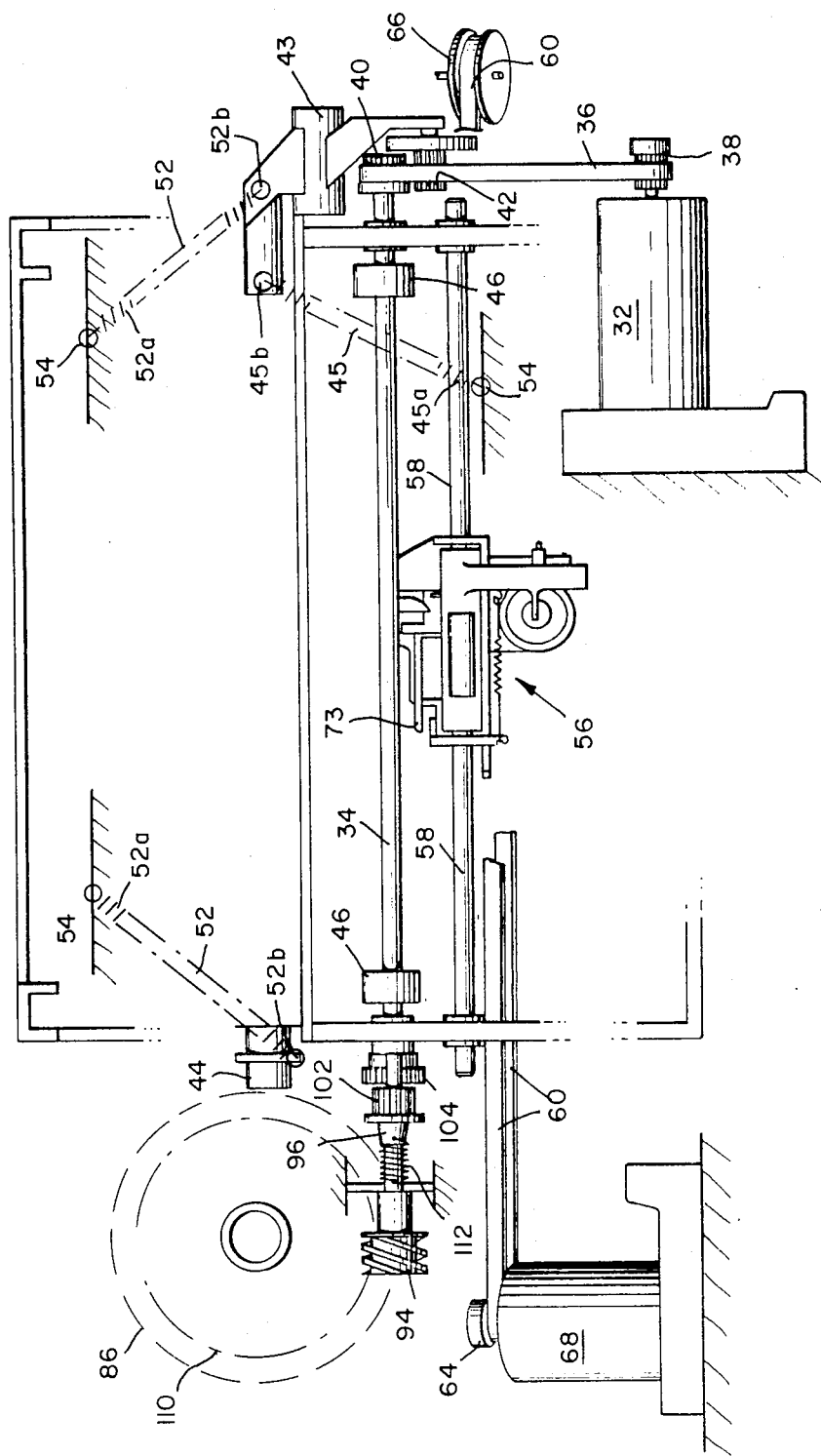
FIG. 4 is a bottom plan view, in skeleton, similar to that of FIG. 3.

Movement of the paper 12 is controlled by a paper axis motor 32, which is coupled to a grit wheel shaft 34 by a belt gear 36, as shown in FIG. 3. The belt 36 is supported at one end by a geared pulley 38 on the drive end of the motor 32 and on the other end by a geared pulley 40 attached to an end of the grit wheel shaft 34 (the drive end). An idler pulley 42 is provided on a lever 43, which uses a spring 45 to tension the belt 36. The spring 45 is attached at one end 45a to a fixed stud 54 extending from the body of the plotter 10, the other end 45b being attached to one end of the lever 43.

A D.C. motor 32 is employed, together with an encoder (not shown) under the control of the microprocessor. Such a combination provides extremely precise control of paper location, since resolution is on the order of 0.001 inch using readily available devices.

The grit wheel shaft 34 has mounted thereon a pair of grit wheels 46, which are exposed by a corresponding pair of openings 48 in the platform 30. Opposed to the grit wheels 46 in touching contact is a corresponding pair of paper gripping wheels 50, rotatably secured on corresponding gripping wheel supports 44. The gripping wheels 50 are urged against the grit wheels 46 by corresponding spring means 52, one end 52a of which is attached to a fixed stud 54 extending from the body of the plotter 10, the other end 52b being attached to one gripping wheel support 44. The gripping wheel support 44 pivots about an axis at 55a to permit lifting of the gripping wheel 50 from the grit wheel 46. This is done for inserting paper 12 onto the platform 30, and is described in further detail below.

The surface of the grit wheels 46 is covered with a rough grit, while the gripping wheels 50 conveniently comprise a rubber material. The paper 12 is moved bidirectionally in the X direction under the control of the two pairs of wheels 46, 50, which contact the bottom and top, respectively, of the paper.

A pen 14 is supported by a carriage assembly 56. The carriage assembly 56 rides on a slider rod 58 and is moved bidirectionally along the Y axis by a belt gear 60. The belt 60 is endless, a portion of it being fixed to the carriage assembly 56 at 62. The belt 60 is looped around a geared pulley 64 at one side of the plotter 10 and around a second pulley 66 at the opposite side. The geared pulley 64 is attached to a motor 68, which controls the bidirectional motion of the carriage assembly 56. The motor 68 is fixedly mounted to a portion of the plotter body.

The pen 14 is held on the carriage assembly 56 by a claw 70 pivotally secured thereto. The carriage assembly 56 includes a body 72, shaped to receive the pen 14 in releasable attachment.

A pen 14 is removed from a preselected position on the turret 16 by rotation of the turret to the preselected position. A foot 73 on the carriage assembly 56 actuates the capper 18, which pivots downwardly, thereby causing the pen boot 20 associated with that pen 14 to pivot downwardly to provide clearance for the pen to be removed laterally. Simultaneously, the finger 25 associated with that pen retracts as a result of cooperative interaction with the claw 70 and body 72, thereby permitting the pen body to be grasped by the claw and body and removed from the turret 16. Replacement of a pen 14 on the turret 16 is essentially the reverse of the above procedure.

In its intial position, the tip of the pen 14 does not contact the printing medium 12. When it is desired to begin plotting, a solenoid 74, upon activation, causes a pen lift bar 76 to pivot, thereby allowing the carriage assembly 56 to pivot about the slider rod 58, which in turn causes the pen 14 to be lowered to the surface of the medium 12. A spring 78 causes the pen 14 to pivot down toward the medium 12. A portion 80 of the carriage assembly 56 extends to partially encompass a guide rod 82 to provide upper and lower limits to the pivoting motion of the carriage assembly.

The pen turret 16 is rotatably held in place by a shaft 84. The turret 16 rests on a spindle 86 which is provided with a plurality of slots 88, each corresponding to the particular location of a pen 14. An open slot 89 is provided in the spindle 86 to permit removal of the spindle from the chassis of the plotter 10.

A key tab 90 is provided on the underside of the spindle 86 to identify the intial position of the turret 16. A stop 91 on the chassis of the plotter 10 is used to index the key tab 90 and to provide a reference position from which the positions of the pens 14 may be located. Initial rotation of the turret 16 occurs in a clockwise fashion until the key tab 90 strikes the stop 91. The turret 16 is now in the reference position (pen #1). Since the position of each pen 14 relative to the reference position is known by the microprocessor, it is a simple matter for the microprocessor to rotate the turret 16 to the appropriate position to permit replacing or removing a selected pen.

During plotting, it is often required to change pens, either to change color or line width or the like. In accordance with the invention, an actuation mechanism is provided which is mechanically coupled to the paper drive mechanism, thereby eliminating the need for a costly turret rotation motor or solenoid, and thereby reducing the weight and cost of the plotter 10.

The actuation mechanism, denoted generally at 92, comprises a worm 94 mounted on one end of a worm shaft 96. A lever engager 98, provided with a walking stop 100 for selectively engaging in slots 88, is secured to a portion of the worm shaft 96. A sliding gear 102 is secured to the opposite end of the worm shaft 96 and is operatively engageable with a grit wheel shaft gear 104, mounted on the end of the grit wheel shaft 34 opposite the drive end 40.

Figure 5:
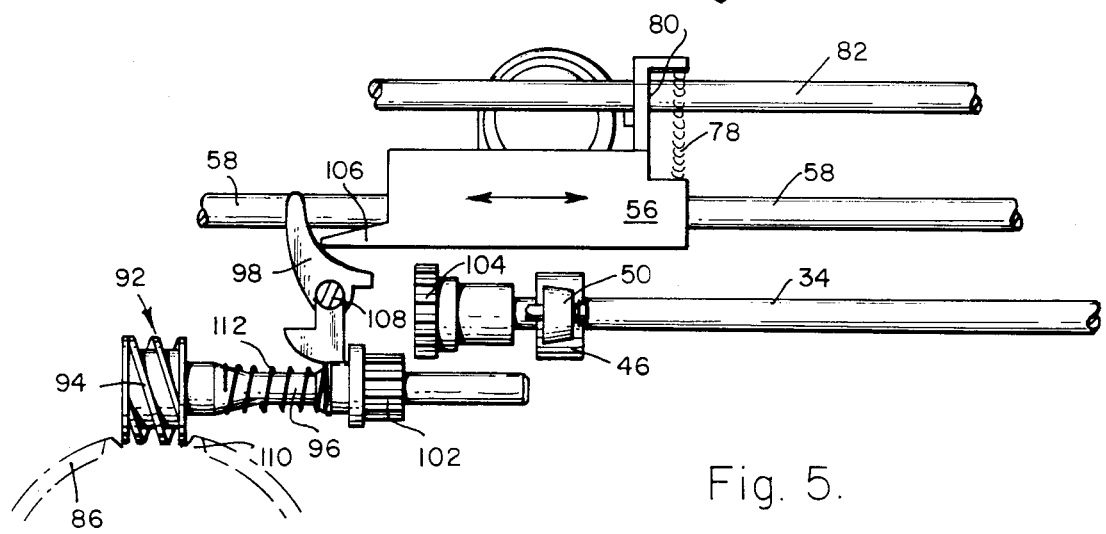
FIG. 5 is a front elevational view in detail of the initiation of actuation of coupling the turret rotation to the paper axis motor.
Figure 6:
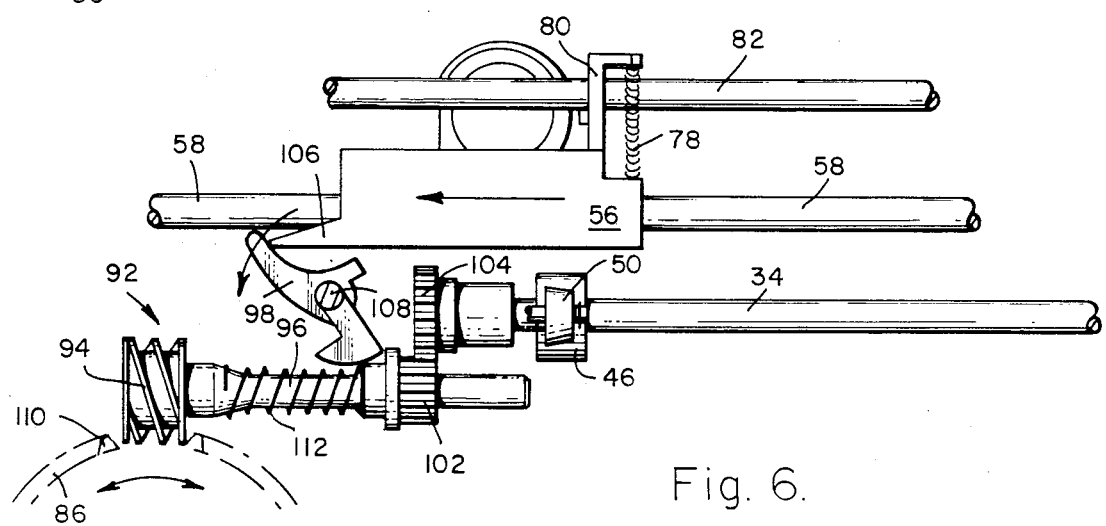
FIG. 6 is a view similar to that of FIG. 5, showing the engagement of the drive train following actuation.
Figure 2:
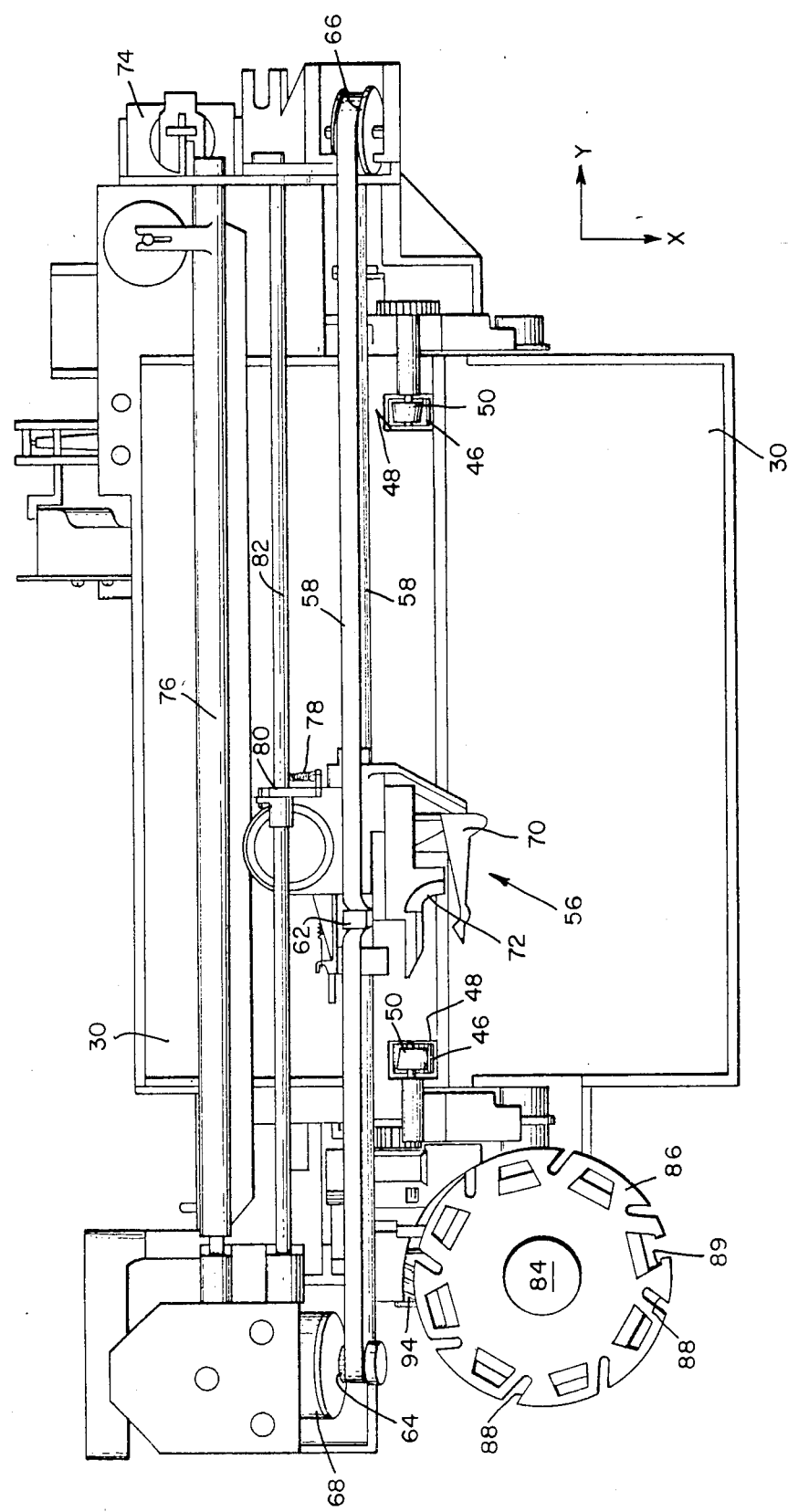
FIG. 2 is a top plan view of the carriage of the plotter and the turret.

The lever engager 98 is engaged by a foot 106 extending from the bottom of the carriage assembly 56 in the direction of the actuation mechanism. As shown in FIG. 5, movement of the carriage assembly 56 in the direction of the actuation mechanism 92 causes the lever engager to pivot about an axis 108 and move the sliding gear 102 in the direction of the grit wheel shaft gear 104. With the lever engager 98 completely engaged, as shown in FIG. 6, the sliding gear 102 is in mating contact with the grit wheel shaft gear 104. Accordingly, any movement of the grit wheel shaft 34 will cause rotation of the worm 96, which is always mechanically coupled with a worm gear 110 on the bottom of the spindle 86. A spring 112 mounted on the worm shaft 96 causes the sliding gear 102 to retract when the lever engager 98 is no longer engaged by the foot 106, thereby decoupling rotation of the turret 16 from the grit wheel shaft 34.

Thus, by providing a worm gear 110 on the bottom of the spindle 86 and a gear 104 on the end of the grit wheel shaft 34, together with a mechanical coupling linkage 92 activated by a foot 106 provided on the bottom of the carriage assembly 56, it will be appreciated that the turret 16 may be rotated by the paper drive motor 32, thereby eliminating the need for a separate motor or solenoid to rotate the turret. Of course, other mechical linkages between the grit wheel shaft 34 and the spindle 86 than that shown, preferably activated by the carriage assembly 56, may also be used in the practice of the invention.

In operation, the carriage assembly 56 is first moved to the extreme right to provide an indication to the microprocessor of the location of the carriage assembly.

The microprocessor now knows the distance to the lever engager 98. The carriage assembly 56 is then moved to the left to engage the lever engager 98.

The turret 16 may now be rotated until the key tab 90 strikes the stop 91, thereby placing the turret in the refererence position.

The carriage assembly 56 is next moved to the extreme right again, to cause the paper gripping wheels 50 to lift, thereby permitting the operator to insert the medium 12 on which plotting will be done. After inserting the medium 12 between the two pairs of wheels 46 and 50, the operator presses a button on the control panel 28 to indicate to the microprocessor that the medium 12 is loaded. The carriage assembly 56 then moves to the left to lower the paper gripping wheels 50, which are tensioned in the lowered position by the springs 52.

The plotter 10 is now ready to plot, and awaits commands from the computer to the microprocessor, which tell the microprocessor which pen 14 to select, how much the medium 12 is to be moved to a predetermined position to begin plotting, the movements of the carriage assembly 56 and medium 12 to complete a plot with that pen, and return of the pen to the turret 16, rotate the turret to retract another pen, and so forth, until the plot is finished.

Once the pen 14 is removed from the turret 16 and during plotting, the turret 16 is decoupled from the rotation of the grit wheel shaft 34. When the plotting is completed, the carriage assembly returns the pen 14 to its position on the turret 16.

INDUSTRIAL APPLICABILITY

The mechanical linkage coupling the grit wheel shaft 34 with the turret spindle 86, thereby eliminating the need for a turret drive motor or solenoid, is expected to find use in plotters employing multiple pens stored in a rotatable turret.

Thus, a pen turret rotation mechanism, providing coupling from the paper drive motor via the grit wheel shaft to the turret spindle and activated by the carriage assembly, has been disclosed. It will be appreciated by those skilled in the art that various modifications and changes of an obvious nature can be made, and all such modifications and changes are considered to be within the scope of the invention, as defined by the appended claims.

What is claimed is:

1. In an improved plotter printer for making plots requiring the use of a plurality of pens maintained in a rotatable turret and including (a) means for accepting and moving a printing medium bidirectionally and (b) means for printing information on said medium, said printing means including a carriage assembly comprising means for removing a pen from and replacing a pen on a preselected position on said turret, means for moving said pen bidirectionally orthogonal to the movement of said paper and means for selectively engaging said pen and said medium for printing thereon, the improvement which comprises means for linking rotation of said turret for selecting said pen to said means for moving said medium.

2. The plotter of claim 1 wherein said linking means is actuated by movement of said carriage assembly.

3. The plotter of claim 2 wherein said means for moving said medium comprises a grit wheel shaft mechanically coupled to a drive motor and said linking means couples rotation of said shaft to a spindle upon which said turret is positioned, said spindle provided with a key tab for determining the intial position of said turret and a plurality of slots, each slot associated with a position of a pen in said turret.

4. The plotter of claim 3 wherein said linking means comprises a gear mounted on one end of said grit wheel shaft, a worm gear mounted on the bottom of said spindle, a rotatable worm shaft having mounted thereon a worm on one end continuously engaged with said worm gear on said spindle, a sliding gear on the other end of said gear shaft selectively engageable with said gear on said grit wheel shaft, a retracting spring intermediate said ends of said worm shaft for retracting said sliding gear, a lever engager for urging said sliding gear into engagement with said grit wheel shaft gear, said lever engager adapted to be actuated by a foot on the bottom of said carriage assembly in response to movement of said carriage assembly and including a walking stop for engagement into one of said slots on said spindle.

5. In an improved plotter printer for making plots requiring the use of a plurality of pens maintained in a rotatable turret and including (a) means for accepting and moving a printing medium bidirectionally including a grit wheel shaft mechanically coupled to a drive motor and (b) means for printing information on said medium, said printing means including a carriage assembly comprising means for removing a pen from and replacing a pen on a preselected position on said turret, means for moving said pen bidirectionally orthogonal to the movement of said paper and means for selectively engaging said pen and said medium for printing thereon, the improvement which comprises means for linking rotation of said turret for selecting said pen to said means for moving said medium, said turret provided with a spindle having a key tab for determining the intial position of said turret and a plurality of slots, each slot associated with a position of said pen in said turret, said linking means adapted to be acutated by movement of said carriage assembly and comprising a gear mounted on one end of said grit wheel shaft, a worm gear mounted on the bottom of said spindle, a rotatable worm shaft having mounted thereon a worm on one end continuously engaged with said worm gear on said spindle, a sliding gear on the other end of said gear shaft selectively engageable with said gear on said grit wheel shaft, a retracting spring intermediate said ends of said worm shaft for retracting said sliding gear, a lever engager for urging said sliding gear into engagment with said grit wheel shaft gear, said lever engager actuated by a foot on the bottom of said carriage assembly in response to movement of said carriage assembly and including a walking stop for engagement into one of said slots on said spindle for coupling rotation of said grit wheel shaft to said spindle upon which said turret is positioned.

6. A method for rotating a turret on a plotter for selection of pens therefrom, said plotter including means for moving a printing medium bidirectionally and carriage means for holding a preselected pen during plotting, said carriage means driven bidirectionally and orthogonal to said printing medium, said moving means including a motor mechanically coupled to a grit wheel shaft, upon which are mounted grit wheel in nipping contact with paper gripping wheels for moving said printing medium therebetween, said method comprising coupling rotation of said grit wheel shaft to said turret by actuation by said carriage assembly.

7. A method of coupling motion from a motor used for bidirectionally moving a printing medium in a plotter to rotate a turret storing a plurality of pens to a preselected position in order to permit retraction of a preselected pen therefrom to be used in plotting on said printing medium, said motor mechanically coupled to a grit wheel shaft, upon which grit wheels are positioned, in nipping contact with corresponding paper gripping wheels to move said printing medium therebetween, said method comprising (a) providing a spindle upon which said turret is positioned, a key tab on said spindle for determining the initial position of said turret and a plurality of slots, each slot being associated with a position of a pen in said turret, a worm gear on the bottom of said spindle, a linking means comprising a gear on one end of said grit wheel shaft, a rotatable worm shaft with a worm on one end continuously engaged with said worm gear on said spindle, a sliding gear on the other end of said gear shaft selectively engageable with said gear on said grit wheel shaft, a retracting spring intermediate said ends of said worm shaft for retracting said sliding gear, a lever engager for urging said sliding gear into engagement with said grit wheel shaft gear, said lever engager actuated by a foot on the bottom of said carriage assembly in response to movement of said carriage assembly, and a walking stop for engagement into one of said slots on said spindle;

(b) causing said carriage assembly to move laterally to engage said linking means;

(c) causing said motor to rotate said grit wheel shaft, thereby causing said spindle and turret mounted thereon to rotate to a preselected position of a preselected pen;

(d) causing said carriage assembly to further move laterally to permit engagement of said pen by said carriage assembly;

(e) causing said carriage assembly to move in the opposite direction to begin plotting and to decouple said turret from rotation of said grit wheel shaft; and (f) returning said pen to said preselected position on said turret when said plotting is completed.

* * * * *